(12) United States Patent
Xiao et al.

(10) Patent No.: US 11,057,958 B2
(45) Date of Patent: Jul. 6, 2021

(54) METHOD AND DEVICE FOR ESTABLISHING/RECONFIGURING DATA BEARER

(71) Applicants: SHARP KABUSHIKI KAISHA, Sakai (JP); FG Innovation Company Limited, New Territories (HK)

(72) Inventors: Fangying Xiao, Shanghai (CN); Renmao Liu, Shanghai (CN); Shohei Yamada, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/337,340

(22) PCT Filed: Aug. 15, 2017

(86) PCT No.: PCT/CN2017/097490
§ 371 (c)(1),
(2) Date: Mar. 27, 2019

(87) PCT Pub. No.: WO2018/059147
PCT Pub. Date: Apr. 5, 2018

(65) Prior Publication Data
US 2020/0037382 A1 Jan. 30, 2020

(30) Foreign Application Priority Data
Sep. 30, 2016 (CN) .......................... 201610873253.9

(51) Int. Cl.
*H04W 76/16* (2018.01)
*H04W 76/20* (2018.01)
(Continued)

(52) U.S. Cl.
CPC ....... *H04W 76/16* (2018.02); *H04W 36/0066* (2013.01); *H04W 76/20* (2018.02);
(Continued)

(58) Field of Classification Search
CPC ..... H04W 76/16; H04W 76/20; H04W 76/22; H04W 88/06; H04W 28/18; H04W 48/08; H04W 48/16; H04W 76/27
See application file for complete search history.

(56) References Cited

U.S. PATENT DOCUMENTS

2015/0271761 A1* 9/2015 Park .................. H04W 72/1242
370/329
2018/0199315 A1* 7/2018 Hong ................... H04L 1/1867
(Continued)

FOREIGN PATENT DOCUMENTS

CN 105228263 A 1/2016

OTHER PUBLICATIONS

Intel Corporation, "RRC aspects for LTE-NR interworking", R2-163587, 3GPP TSG-RAN WG2 Meeting #94 Nanjing, China, May 23-27, 2016.
(Continued)

Primary Examiner — Mewale A Ambaye
(74) Attorney, Agent, or Firm — ScienBiziP, P.C.

(57) ABSTRACT

The present application provides a method for establishing/reconfiguring a data bearer that comprises receiving a request message for data bearer establishment/reconfiguration, wherein the request message comprises a data bearer identity used to identify a data bearer and a bearer type indication cell used to indicate a type of a to-be-established/reconfigured data bearer; and establishing/reconfiguring a corresponding data bearer according to the request message. The present application further provides user equipment and a base station for establishing/reconfiguring a data bearer.

20 Claims, 9 Drawing Sheets

(51) Int. Cl.
  *H04W 36/00* (2009.01)
  *H04W 76/22* (2018.01)
  *H04W 84/20* (2009.01)
  *H04W 88/06* (2009.01)

(52) U.S. Cl.
  CPC .......... *H04W 76/22* (2018.02); *H04W 84/20* (2013.01); *H04W 88/06* (2013.01)

(56) References Cited

U.S. PATENT DOCUMENTS

| | | | |
|---|---|---|---|
| 2019/0045404 A1* | 2/2019 | Tsai | H04W 36/0088 |
| 2019/0342932 A1* | 11/2019 | Futaki | H04W 76/16 |
| 2019/0356460 A1* | 11/2019 | Tsuboi | H04W 48/16 |
| 2020/0120750 A1* | 4/2020 | Liu | H04L 69/22 |
| 2020/0374964 A1* | 11/2020 | Wang | H04W 88/06 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.11.0 (Sep. 2016).

NTT DOCOMO, "New SID Proposal: Study on New Radio Access Technology", RP-160671, 3GPP TSG RAN Meeting #71 Goteborg, Sweden, Mar. 7-10, 2016.

3GPP, Evolved Universal Terrestrial Radio Access (E-UTRA), Radio Resource Control (RRC), Protocol specification (Release 13), 3GPP TS 36.331 V13.2.0 (Jun. 2016).

* cited by examiner

METHOD AND DEVICE FOR ESTABLISHING/RECONFIGURING DATA BEARER

TECHNICAL FIELD

The present application relates to the field of wireless communications technology. More particularly, the present application relates to a method and a device for establishing/reconfiguring a data bearer.

BACKGROUND

A new research project on 5G technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

The deployment scenarios shown in FIGS. 1-4 are included in the NR dual connectivity deployment scenarios agreed at the 3GPP RAN2 #95 meeting held in August 2016.

In FIG. 1, an NR base station (NR Node B, gNB for short) is shown. The gNB is a logical node that serves as a master base station (referred to as an MgNB) responsible for radio transmission and reception to and from user equipment (UE) in one or more cells. That is, a control plane connection is established between the MgNB and a next-generation core network (referred to as NextGen Core). An enhanced Long Term Evolution (eLTE) base station (referred to as an eLTE eNB) is used as a secondary base station. User plane data streams are transmitted through NR base stations and eLTE eNBs over the next generation core network. Specifically, four user plane data transmission modes exist: mode a1: user plane data is transmitted between a gNB and the next generation core network and resources provided by the gNB are used (the corresponding data bearer (DRB) is referred to as an NR-eLTE Master Cell Group (MCG) bearer); mode a2: user plane data is transmitted between an eLTE eNB and the next generation core network and resources provided by the eLTE eNBs are used (the corresponding data bearer is referred to as an NR-eLTE Secondary Cell Group (SCG) bearer); mode a3: user plane data is transmitted between the gNB and the next-generation core network, where one part of the data is transmitted using radio resources of the gNB, and the other part of the data is sent to and from the eLTE eNB through an interface between the gNB and the eLTE eNB and is transmitted using radio resources of the eLTE eNB (the corresponding data bearer is referred to as an NR-eLTE MCG split bearer); and mode a4: user plane data is transmitted between the eLTE eNB and the next-generation core network, where one part of the data is transmitted directly using radio resources of the eLTE eNB, and the other part of the data is sent to and from the NR gNB through an interface between the gNB and the eLTE eNB and is transmitted using radio resources of the NR gNB (the corresponding data bearer is referred to as an NR-eLTE split bearer). In modes a3 and a4, user plane data is transmitted via the next generation core network by using resources provided by both a gNB and an eLTE eNB.

In FIG. 2, both a master base station MgNB and a secondary base station SgNB are gNBs. That is, a control plane connection is established between the MgNB and a next-generation core network; and a user plane data stream is transmitted through the MgNB and the SgNB over the next-generation core network. Specifically, four user plane data transmission modes exist: mode b1: user plane data is transmitted between an MgNB and the next generation core network and resources provided by the MgNB are used (a corresponding data bearer is referred to as an NR-NR MCG bearer); mode b2: user plane data is transmitted between an SgNB and the next generation core network and resources provided by the secondary base station SgNB are used (a corresponding data bearer is referred to as an NR-NR SCG bearer); mode b3: user plane data is transmitted between the MgNB and the next-generation core network, where one part of the data is transmitted using radio resources of the master base station MgNB, and the other part of the data is sent to/from the SgNB through an interface between the master base station MgNB and the secondary base station SgNB and is transmitted using radio resources of the SgNB (the corresponding data bearer is referred to as an NR-NR MCG split bearer); and mode b4: user plane data is transmitted between the SgNB and the next-generation core network, where one part of the data is transmitted directly using radio resources of the SgNB, and the other part of the data is sent to/from the MgNB through an interface between the SgNB and the MgNB and is transmitted using radio resources of the MgNB (the corresponding data bearer is referred to as an NR SCG split bearer). In modes b3 and b4, user plane data is transmitted using resources provided by both the MgNB and the SgNB over the next-generation core network.

In FIG. 3, a long term evolution base station LTE eNB is used as a master base station (referred to as an LTE MeNB). That is, the control plane connection is conducted between the LTE eNB and a core network (referred to as an EPC). A gNB is used as a secondary base station. User plane data streams are transmitted through the gNB and the LTE eNB via the EPC. Specifically, four user plane data transmission modes exist: mode c1: user plane data is transmitted between an LTE eNB and the EPC, and resources provided by the LTE eNB are used (the corresponding data bearer is referred to as an LTE-NR MCG bearer); mode c2: user plane data is transmitted between a gNB and the EPC by using resources provided by the gNB (the corresponding data bearer is referred to as an LTE-NR SCG bearer); mode c3: user plane data is transmitted between an LTE eNB and the EPC, in which one part of the data is transmitted using radio resources of the LTE eNB, and the other part of the data is sent to/from a gNB through an interface between the gNB and the LTE eNB and is transmitted using radio resources of the gNB (the corresponding data bearer is referred to as an LTE-NR MCG split bearer); and mode c4: user plane data is transmitted between a gNB and the EPC, in which one part of the data is transmitted directly using radio resources of the gNB, and the other part of the data is sent to/from an LTE eNB through an interface between the gNB and the LTE eNB and is transmitted using radio resources of the LTE eNB (the corresponding data bearer is referred to as an LTE-NR SCG split bearer). In modes c3 and c4, user plane data is transmitted via the EPC by using resources provided by both a gNB and an LTE eNB. In FIG. 4, an eLTE eNB is used as a master base station (referred to as an eLTE MeNB). That is, the control plane connection is conducted between the eLTE eNB and a next generation core network. A gNB is used as a secondary base station. User plane data streams are transmitted through the gNB and the eLTE eNB via the next generation core network. Specifically, four user plane data transmission modes exist: mode d1: user plane data is transmitted between an eLTE eNB and the next generation core network, and resources provided by the eLTE eNB are used (the corresponding data bearer is referred to as an eLTE-NR MCG bearer); mode d2, user plane data is transmitted between a gNB and the next generation core network, and resources provided by the gNB are used (the corresponding data bearer is referred to as an eLTE-NR SCG bearer); mode d3, user plane data is transmitted between an eLTE eNB and the next generation core network, in which one part of the data is transmitted using radio resources of the eLTE eNB, and the other part of the data is sent to/from a gNB through an interface between the gNB and the eLTE eNB and is transmitted using radio resources of the gNB (the corresponding data bearer is referred to as an eLTE-NR MCG split bearer); and mode d4, user plane data is transmitted between a gNB and the next generation core network, in which one part of the data is transmitted directly using radio resources of the gNB, and the other part of the data is sent to/from an eLTE eNB through an interface between the gNB and the eLTE eNB and is transmitted using radio resources of the eLTE eNB (a corresponding data bearer is referred to as an eLTE-NR SCG split bearer). In modes d3 and d4, user plane data is transmitted using resources provided by both the gNB and the eLTE eNB over the next-generation core network.

SUMMARY OF INVENTION

However, how to configure a corresponding data hearer (DRB) for user equipment (UE) in a dual connectivity deployment scenario and how to reconfigure a data bearer are problems that need to be solved.

In order to solve the above technical problems, the present application provides a method for establishing/reconfiguring a data bearer, comprising: receiving a request message for data bearer establishment/reconfiguration, wherein the request message comprises a data bearer identity used to identify a data bearer and a bearer type indication cell used to indicate a type of a to-be-established/reconfigured data bearer; and establishing/reconfiguring a corresponding data bearer according to the request message.

In one embodiment, the types of the data bearer comprise a Master Cell Group (MCG) bearer, a Secondary Cell Group (SCG) bearer, an MCG split bearer, and an SCG split bearer.

In one embodiment, the request message for data bearer establishment/reconfiguration comprises a Radio Resource Control (RRC) reconfiguration message.

In one embodiment, the RRC reconfiguration message comprises an RRC message from two or more Radio Access Technologies (RATs).

In one embodiment, the request message for data bearer establishment/reconfiguration comprises a cell used to indicate a secondary base station type.

In one embodiment, corresponding processing for establishing/reconfiguring the data bearer is performed according to content of the cell used to indicate the secondary base station type.

According to another aspect, user equipment is provided, comprising: a receiving unit, configured to receive a request message for data bearer establishment/reconfiguration, wherein the request message comprises a data bearer identity used to identify a data bearer and a bearer type indication cell used to indicate a type of a to-be-established/reconfigured data bearer; and a processing unit, configured to establish/reconfigure a corresponding data bearer according to the request message.

In one embodiment, the types of the data bearer comprise a blaster Master Cell Group (MCG) bearer, a Secondary Cell Group (SCG) bearer, an MCG split bearer, and an SCG split bearer.

In one embodiment, the request message for data bearer establishment/reconfiguration comprises a Radio Resource Control (RRC) reconfiguration message.

In one embodiment, the RRC reconfiguration message comprises an RRC message from two or more Radio Access Technologies (RATs).

In one embodiment, the request message for data bearer establishment/reconfiguration comprises a cell used to indicate a secondary base station type.

In one embodiment, the processing unit is configured to: perform corresponding processing for establishing/reconfiguring the data bearer according to content of the cell used to indicate the secondary base station type.

According to another aspect, a method for establishing/reconfiguring a data bearer is provided, comprising: sending a request message for data bearer establishment/reconfiguration, wherein the request message comprises a data bearer identity used to identify a data bearer and a bearer type indication cell used to indicate a type of a to-be-established/reconfigured data bearer; and performing communication by using an established/reconfigured corresponding data bearer.

In one embodiment, the types of the data bearer comprise a Master Cell Group (MCG) bearer, a Secondary Cell Group (SCG) bearer, an MCG split bearer, and an SCG split bearer.

In one embodiment, the request message for data bearer establishment/reconfiguration comprises a Radio Resource Control (RRC) reconfiguration message.

In one embodiment, the RRC reconfiguration message comprises an RRC message from two or more Radio Access Technologies (RATs).

In one embodiment, the request message for data bearer establishment/reconfiguration comprises a cell used to indicate a secondary base station type.

According to another aspect, a base station is provided, comprising: a sending unit, configured to send a request message for data bearer establishment/reconfiguration, wherein the request message comprises a data bearer identity used to identify a data bearer and a bearer type indication cell used to indicate a type of a to-be-established/reconfigured data bearer; and a communication unit, configured to perform communication by using an established/reconfigured corresponding data bearer.

In one embodiment, the types of the data bearer comprise a Master Cell Group (MCG) bearer, a Secondary Cell Group (SCG) bearer, an MCG split bearer, and an SCG split bearer.

In one embodiment, the request message for data bearer establishment/reconfiguration comprises a Radio Resource Control (RRC) reconfiguration message.

In one embodiment, the RRC reconfiguration message comprises an RRC message from two or more Radio Access Technologies (RATs).

In one embodiment, the request message for data bearer establishment/reconfiguration comprises a cell used to indicate a secondary base station type.

BRIEF DESCRIPTION OF DRAWINGS

The above and other features of the present application will become more apparent through the following detailed description made in conjunction with the accompanying drawings, where.

Figure 1:
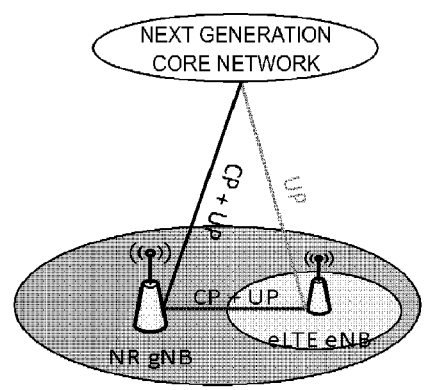
FIG. 1 illustrates a schematic view of an NR-eLTE dual connectivity deployment scenario.
Figure 2:
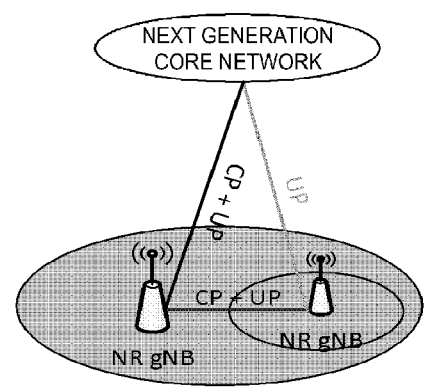
Figure 3:
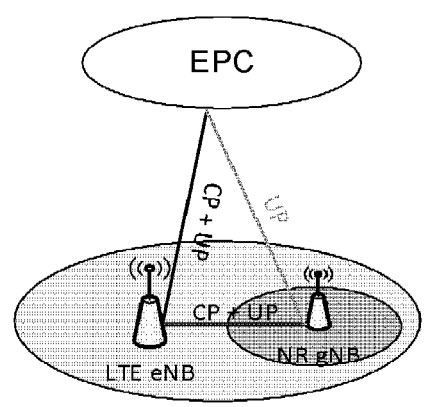
Figure 4:
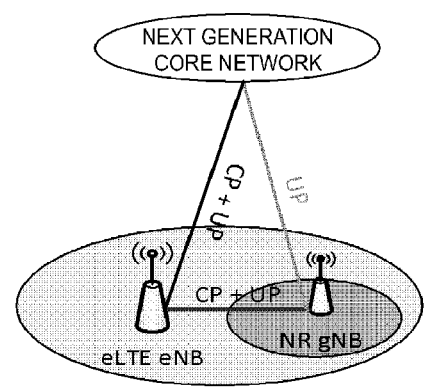
Figure 5:
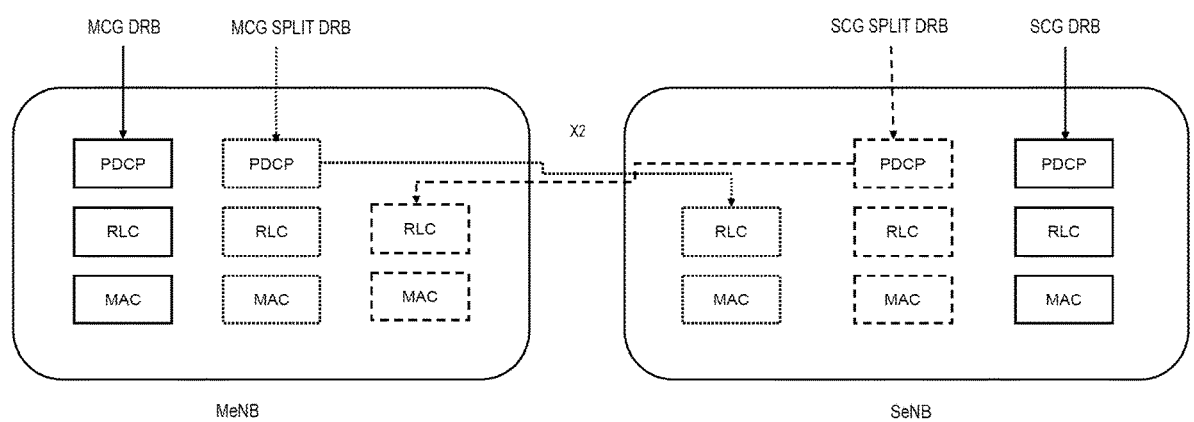
Figure 6:
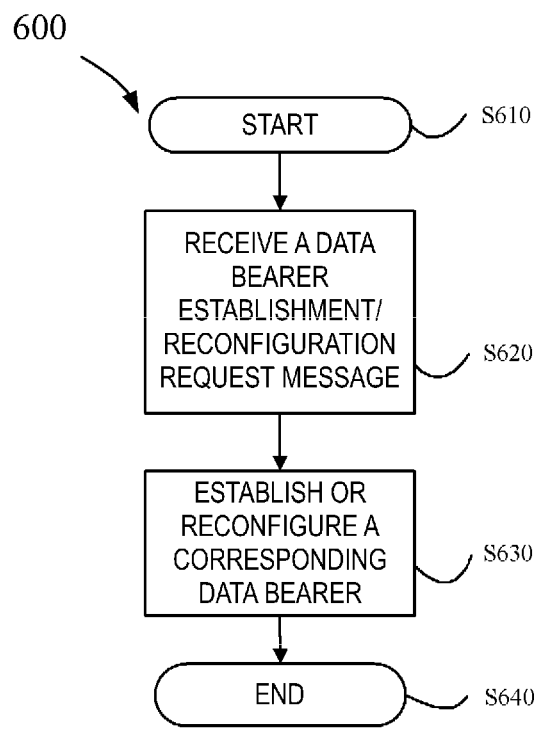
Figure 7:
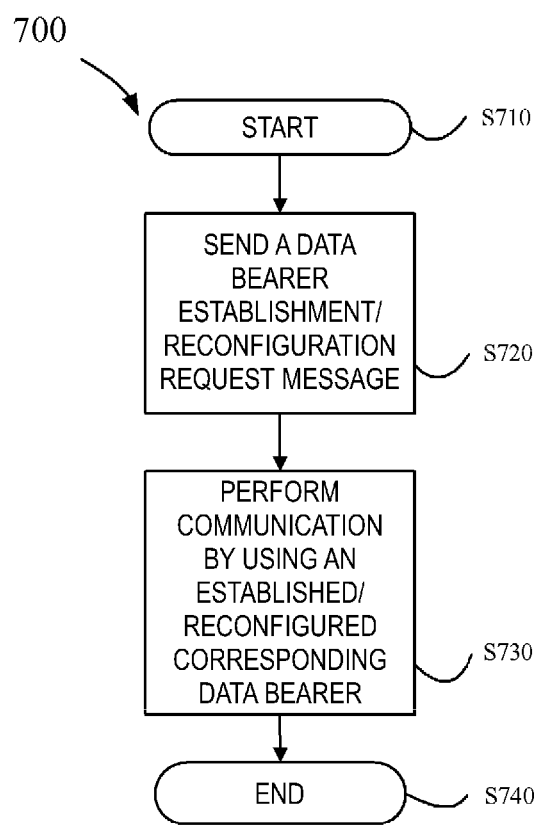
Figure 8:
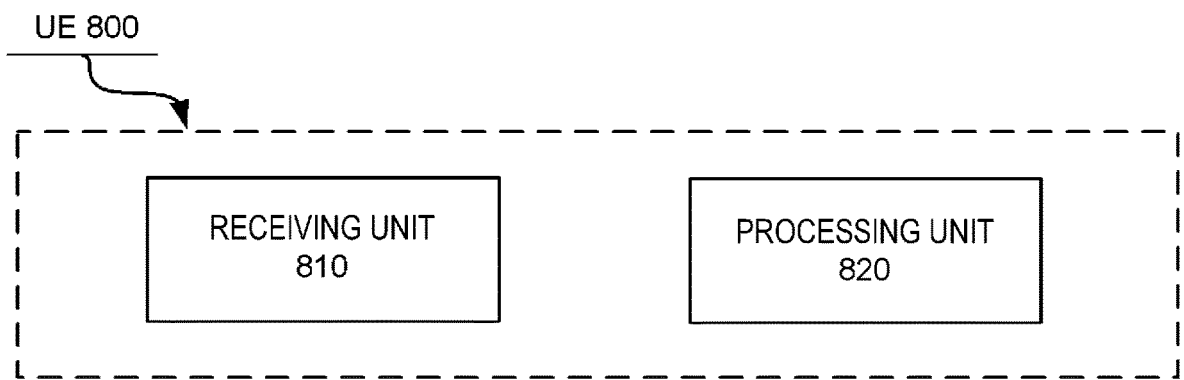
Figure 9:
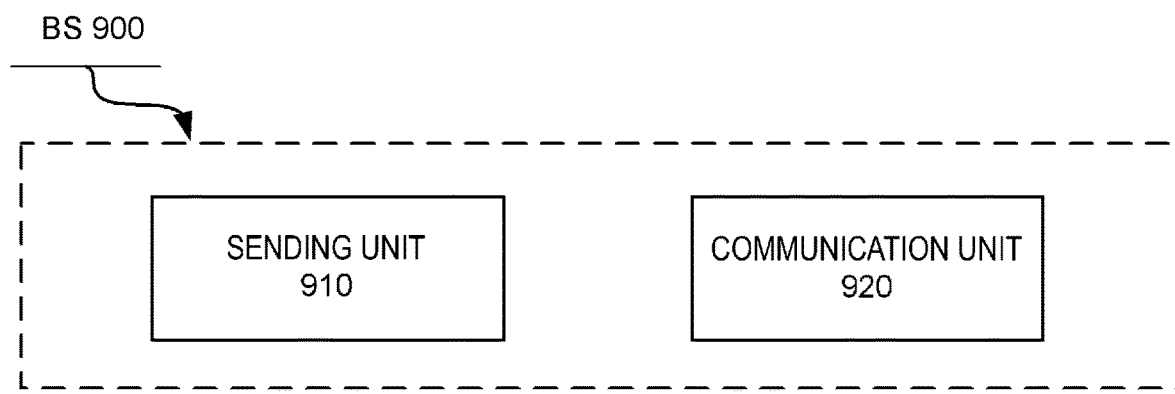

FIG. illustrates a schematic view of an NR-NR dual connectivity deployment scenario;

FIG. 3 illustrates a schematic view of an LTE-NR dual connectivity deployment scenario;

FIG. 4 illustrates a schematic view of an eLTE-NR dual connectivity deployment scenario;

FIG. 5 illustrates a schematic view of wireless protocol layer 2 entities involved in an LIE dual connectivity deployment manner;

FIG. 6 illustrates a flowchart of a method for establishing/reconfiguring a data bearer according to an embodiment of the present application;

FIG. 7 illustrates a flowchart of a method for establishing/reconfiguring a data bearer according to another embodiment of the present application;

FIG. 8 illustrates a block diagram of a user equipment according to an embodiment of the present application; and FIG. 9 illustrates a block diagram of base station according to an embodiment of the present application.

DETAILED DESCRIPTION OF EMBODIMENTS

The follow ng describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms included in the present application are described below. Unless otherwise stated, the terms included in the present application are used as defined herein. The present invention uses dual connectivity as an example, but the method described in the present invention is not limited thereto; and those skilled in the art can easily expand the dual connectivity scenarios to multi-connection scenarios. In addition, the present application is illustrated by taking LTE, eLTE, NR, and a corresponding core network and next generation core network as examples. It should be noted that the present application is not limited to the LTE, eLTE, NR, and corresponding core network and next generation core network. Instead, the present application is also applicable to other wireless communication systems, for example, a 6G wireless communication system.

In the present application, under dual connectivity, a base station of which a control plane is connected to an EPC or a next generation core network is referred to as a master base station MeNB, which may be an NR MgNB, an LTE MeNB, or an eLTE MeNB. A base station of which a control plane is not connected to an EPC or a next generation core network not a master base station) but provides transmission resources for transmission of user plane data is referred to as a secondary base station SeNB, which may be an NR SgNB, an LTE SeNB, or an eLTE SeNB.

An X-Y MCG bearer means that the MeNB is X, the SeNB is Y, and a radio protocol layer of the bearer is located in X; and resources provided by X are used. X may be an NR MgNB, an LTE MeNB, or an eLTE MeNB; Y may be an NR SgNB, an LTE SeNB, or an eLTE SeNB.

An X-Y SCG bearer means that the MeNB is X, the SeNB is Y, and a radio protocol layer of the bearer is located in Y; and resources provided by Y are used. X may be an NR MgNB, an LTE MeNB, or an eLTE MeNB; Y may be an NR SgNB, an LTE SeNB, or an eLTE SeNB.

An X-Y MCG split bearer means that the master base station is X, the secondary base station is Y, and a radio protocol layer of the bearer is located in X and Y; user plane data with an EPC or a next-generation core network ends at X, and resources provided by both X and Y are used. X may be an NR MgNB, an LTE MeNB, or an eLTE MeNB; Y may be an NR SgNB, an LTE SeNB, or an eLTE SeNB.

An X-Y SCG split bearer means that the master base station is X, the secondary base station is Y, and a radio protocol layer of the bearer is located in X and Y; user plane data with an EPC or a next-generation core network ends at Y, and resources provided by both X and Y are used. X may be an NR MgNB, an LTE MeNB, or an eLTE MeNB; Y may be an NR SgNB, an LTE SeNB, or an eLTE SeNB.

An X MCG bearer means that the MeNB is X, and the SeNB may be an NR SgNB, an LTE SeNB, or an eLTE SeNB. A radio protocol layer of the bearer is located in X; and resources provided by X are used. X may be an NR MgNB, an LTE MeNB, or an eLTE MeNB.

An X SCG bearer means that the MeNB is X, and the SeNB may be an NR SgNB, an LTE SeNB, or an eLTE SeNB. A radio protocol layer of the bearer is located in SeNB; and resources provided by SeNB are used. X may be an NR MgNB, an LTE MeNB, or an eLTE MeNB.

An X MCG split bearer means that the MeNB is X, and the SeNB may be an NR SgNB, an UTE SeNB, or an eLTE SeNB. A radio protocol layer of the bearer is located in X and the SeNB; user plane data with an EPC or a next-generation core network ends at X, and resources provided by both X and the SeNB are used. X may be an NR MgNB, an LTE MeNB, or an eLTE MeNB.

An X SCG split bearer means that the MeNB is X, and the SeNB may be an NR SgNB, an LTE SeNB, or an eLTE SeNB. A radio protocol layer of the bearer is located in X and the SeNB; user plane data with an EPC or a next-generation core network ends at the SeNB, and resources provided by both X and the SeNB are used. X may be an NR MgNB, an LTE MeNB, or an eLTE MeNB.

An NR MCG bearer may comprise one or a plurality of an NR-eLTE MCG bearer, an NR-NR MCG bearer, and an NR-LTE MCG bearer. A UE may determine which one of the listed bearers an NR MCG bearer is according to a secondary base station type.

An LIE MCG bearer may comprise one or a plurality of an LTE-eLTE MCG bearer, an LTE-NR MCG bearer, and an LTE-LTE MCG bearer. A UE may determine which one of the listed bearers an LTE MCG bearer is according to a secondary base station type.

An eLTE MCG bearer may comprise one or a plurality of an eLTE-eLTE MCG bearer, an eLTE-NR MCG hearer, and an eLTE-LTE MCG bearer. A UE may determine which one of the listed bearers an eLTE MCG bearer is according to a secondary base station type.

An NR SCG bearer may comprise one or a plurality of an NR-eLTE SCG bearer, an NR-NR SCG bearer, and an NR-LTE SCG bearer. A UE may determine which one of the listed bearers an NR SCG bearer is according to a secondary base station type.

An LTE SCG bearer may comprise one or a plurality of an LTE-eLTE SCG bearer, an LTE-NR SCG bearer, and an LTE-LTE SCG bearer. A UE may determine which one of the listed bearers an LTE SCG bearer is according to a secondary base station type.

An eLTE SCG bearer may comprise one or a plurality of an eLTE-eLTE SCG bearer, an eLTE-NR SCG bearer, and an eLTE-LTE SCG bearer. A UE may determine which one of the listed bearers an eLTE SCG bearer is according to a secondary base station type.

An NR MCG split bearer may comprise one or a plurality of an NR-eLTE MCG split bearer, an NR-NR MCG split bearer, and an NR-LTE MCG split bearer. A UE may determine which one of the listed bearers an NR MCG split bearer is according to a secondary base station type.

An LTE MCG split bearer may comprise one or a plurality of an LTE-eLTE MCG split bearer, an LTE-NR MCG split bearer, and an LTE-LTE MCG split bearer. A UE may determine which one of the listed bearers an LTE MCG split bearer is according to a secondary base station type.

An eLTE MCG split bearer may comprise one or a plurality of an eLTE-eLTE MCG split bearer, an eLTE-NR MCG split bearer, and an eLTE-LTE MCG split bearer. A UE may determine which one of the listed bearers an eLTE MCG split bearer is according to a secondary base station type.

An NR SCG split bearer may comprise one or a plurality of an NR-eLTE SCG split bearer, an NR-NR SCG split bearer, and an NR-LTE SCG split bearer. A UE may determine which one of the listed bearers an NR SCG split bearer is according to a secondary base station type.

An LTE SCG split bearer may comprise one or a plurality of an LTE-eLTE SCG split bearer, an LTE-NR SCG split bearer, and an LTE-LTE SCG split bearer. A UE may determine which one of the listed bearers an LTE SCG split bearer is according to a secondary base station type.

An eLTE SCG split bearer may comprise one or a plurality of an eLTE-eLTE SCG split bearer, an eLTE-NR SCG split bearer, and an eLTE-LTE SCG split bearer. A UE may determine which one of the listed bearers an eLTE SCG split bearer is according to a secondary base station type.

Unless otherwise stated, the MCG bearer in the present application may comprise one or a plurality of: an NR MCG bearer, an LTE MCG bearer, and an eLTE MCG bearer. A UE may determine which one of the listed bearers the MCG bearer is according to a master base station type. The SCG bearer may Comprise one or a plurality of: an NR SCG bearer, an LTE SCG bearer, and an eLTE SCG bearer. A UE may determine which one of the listed bearers the SCG bearer is according to a master base station type. The MCG split bearer may comprise one or a plurality of: an NR MCG split bearer, an LTE MCG split bearer, and an eLTE MCG split bearer. A UE may determine which one of the listed bearers the MCG split bearer is according to a master base station type. The SCG split bearer may comprise one or a plurality of: an NR SCG split bearer, an LTE SCG split bearer, and an eLTE SCG split bearer. A UE may determine which one of the listed bearers the SCG split bearer is according to a master base station type.

A Master Cell Group (MCG) is a group of serving cells associated with a master base station, and comprises one primary cell PCell and can also comprise one or a plurality of secondary cells SCells. A Secondary Cell Group (SCG) is a group of serving cells associated with a secondary base station, and comprises one PSCell and can also comprise one or a plurality of SCells. The PCell is a cell that operates at a primary carrier frequency. In this cell, UE performs an initial connection establishment process or starts a connection reestablishment process or indicates the cell as a PCell during a handover process. The PSCell is an SCG cell on which a UE performs random access when an SCG changing process is executed. The SCell is a cell that operates on a secondary carrier frequency. The SCell can be configured after a Radio Resource Control (RRC) connection is established, and can provide additional radio resources.

Definitions of all cells included in the present application are described below. It should be noted that in the present application, each cell corresponds to which wireless communication system types of NR, LTE, and eLTE is not explicitly indicated. Instead, the cell is named using the method used in LTE; nevertheless, the present application is not limited thereto. The present application also supports different naming methods. However, according to MeNB and SeNB types involved in dual connectivity, those skilled in the art could determine which corresponding cell is an entity that corresponds to which type of base station (cell group).

scg-Configuration cell may comprise information about releasing or configuring or modifying an SCG. The scg-Configuration cell may be differently named when the type of the secondary base station (or the secondary cell group) is different. For example, when the SeNB is an LTE SeNB, the scg-Configuration cell is denoted as scg-Configuration-LTE; when the SeNB is an eLTE SeNB, the scg-Configuration cell is denoted as scg-ConfigurationeLTE; and when the SeNB is an NR SeNB, the scg-Configuration cell is denoted as scg-ConfigurationNR.

drb-ToAddModListSCG cell refers to a group of SeNB DRBs that need to be added or modified, wherein the DRBs can be SCG DRBs, MCG split DRBs, or SCG split DRBs. When an SCG is configured, the E-UTRAN or NR configures at least one SCG DRB, MCG split DRB, or SCG split DRB. The drb-ToAddModListSCG cell can be included in a cell of radioResourceConfigDedicatedSCG used to configure radio resources of an SCG.

drb-ToAddModList cell refers to a group of DRBs that need to be added or modified, wherein the drb-ToAddModList cell can be included in a cell radioResourceConfigDedicated used to establish/modify/release RBs, modify a MAC main configuration, modify an SPS configuration, and modify a particular physical layer configuration.

pdcp-Config cell may comprise configurable PDCP parameters of DRBs;

drb-Identity cell refers to a data bearer DRB identity;

rlc-Config cell may comprise configuration information of RLC entities corresponding to SRBs and DRBs;

logicalChannelIdentity cell refers to a logical channel identity; and logicalChannelConfig cell may comprise parameters used to configure a logical channel.

It should be noted that in different deployment scenarios or different wireless communication systems, base stations, master base stations, secondary base stations, cells, master cell groups, secondary cell groups, data bearers DRBs, core networks, each entity or the like may be differently named. In the present application, different naming methods can be used in different deployment scenarios or different wireless communication systems.

FIG. 5 illustrates wireless protocol layer 2 entities involved in an LTE dual connectivity deployment manner, including Packet Data Convergence Protocol PDCP entities, Radio Link Control RLC entities, and Media Access Control MAC entities. An interface between an MeNB and an SeNB is denoted as X2. Control plane data and user plane data can be transmitted over the same interface or different interfaces. Functions provided by PDCP entities comprise allocating a Serial Number SN, header compression ROHC, integrity protection (only for control plane), encryption, additional PDCP headers, routing or the like to data from an EPC. It should be noted that not all bearers need all functions provided by PDCP entities. For example, a signaling bearer needs no routing; a data bearer needs no integrity protection; and a split bearer in a dual connectivity deployment needs no header compression or the like. Functions provided by RLC entities comprise: transmission data buffering, segmentation/cascading, retransmission, adding an RLC header or the like. The functions provided by RLC entities are different when the configured RLC mode is different. For example, an RLC Unacknowledged Mode (RLC UM) does not have a retransmission function, while an RLC Acknowledged Mode (RLC AM) has a retransmission function. Functions provided by MAC entities comprise: multiplexing/de-multiplexing, logical channel priority (only for uplink), random access, HARQ or the like. It should be noted that in dual connectivity, a UE can comprise two MACs, one of which corresponds to an MCG and the other corresponds to an SCG.

In an NR and/or eLTE communication system, a wireless protocol layer also needs all or some of the functions provided by PDCP entities, RLC entities, and MAC entities; a wireless protocol layer may also need other functions not provided by PDCP entities, RLC entities, and MAC entities, such as a beam (Beam) management function. Combination modes and layering modes of the functions may also differ from those in LTE. For example, in NR, reordering functions of PDCP entities and RLC entities can be integrated and provided only in one entity, for example, only in the PDCP. The present application is not limited to the combination modes and the layering modes of the functions provided by PDCP entities, RLC entities, and MAC entities of LTE. In the present application, more or less entities (layers) may present in an NR or eLTE. For example, only two layers may be provided in NR: an upper layer of layer 2 and a lower layer of layer 2.

In the present application, for ease of differentiation, PDCP entities, RLC entities, and MAC entities of an LTE are respectively labeled as LTE PDCP entities, LTE RLC entities, and LTE MAC entities; PDCP entities, RLC entities, and MAC entities of an eLTE are respectively labeled as eLTE PDCP entities, eLTE RLC entities, and eLTE MAC entities; and PDCP entities, RLC entities, and MAC entities of an NR are respectively labeled as NR PDCP entities, NR RLC entities, and NR MAC entities. In each embodiment, if a specific entity type corresponding to a PDCP entity, an RLC entity, or a MAC entity is not explicitly indicated, i.e., which type of entities of LTE, eLTE, and NR corresponding to a PDCP entity, an RLC entity, or a MAC entity is not explicitly indicated, then the type of the corresponding PDCP entity, RLC entity, or MAC entity and configuration information of the corresponding entity can be inferred according to MeNB and SeNB types in dual connectivity.

In the present application, a PDCP entity is used as an entity that implements data separation and/or aggregation in an MeNB and/or SeNB. That is, after user plane data is processed by a PDCP entity, one part of the data is transmitted using resources provided by a base station where the PDCP entity is located, and the other part of the data is sent to/from another base station and transmitted using resources provided by the base station. Optionally, the data transmitted through an SeNB is further processed by another entity (referred to as an LNAAP entity). The LNAAP entity is responsible for encapsulating/de-encapsulating the data from/to the PDCP entity according to a form required by a dual connectivity deployment, and then sending the data to/from the SeNB. For example, the LNAAP entity adds a DRB identity or the like to each PDCP PDU from the PDCP entity.

It should be noted that for different MeNB types (e.g., NR MeNBs, LIE MeNBs, and eLTE MeNBs), entities for implementing data separation and/or aggregation may have different names; nevertheless, they are collectively referred to as PDCP entities in the present application. The entities can implement the data separation and/or aggregation function.

FIG. 6 illustrates a flowchart of a method for establishing/reconfiguring a data bearer according to an embodiment of the present application. The method shown in FIG. 6 can be applied to a process of establishing MCG bearers, SCG bearers, MCG split bearers, and SCG split bearers in NR, LTE, and eLTE dual connectivity deployment scenarios. The following description is provided by taking a data bearer DRB as an example. It should be noted that the present application is not limited to the naming, but is also applicable to situations where different naming methods may be used in eLTE or NR.

As shown in FIG. 6, a method 600 starts at step S610. At step S620, a data bearer establishment/reconfiguration request message is received. The request message may comprise a data bearer identity and a bearer type indication cell. The data bearer identity is used to identify a data bearer; and the bearer type indication cell is used to indicate a type of the to-be-established/reconfigured data bearer. At step S630, a corresponding data bearer is established/reconfigured according to the request message. Finally, the method 600 ends at step S640.

The method shown in FIG. 6 is described in detail below according to two aspects: establishing a data bearer and reconfiguring a data bearer.

Establishing A Data Bearer

Processes of establishing an MCG bearer, an SCG bearer, an MCG split bearer, and an SCG split bearer in an LTE, and NR dual connectivity deployment scenarios are described below in a way similar to the way of describing a process of establishing an LWA bearer in LTE and WLAN aggregation (LWA).

At step S620, a DRB establishment request message is received. The request message is used to establish a corresponding bearer. The bearer establishment request message may be an LTE or eLTE or NR Radio Resource Control (RRC) reconfiguration message. This depends on the dual connectivity deployment scenario: if an LTE eNB is a master base station, then the bearer establishment request message can be referred to as an LTE radio resource control reconfiguration message; if an eLTE eNB is a master base station, then the bearer establishment request message can be referred to as an eLTE radio resource control reconfiguration message; and if an NR gNB is a master base station, then the bearer establishment request message can be referred to as an NR radio resource control reconfiguration message. Preferably, a radio resource control message may comprise radio resource control messages from two or more Radio Access Technologies (RATs).

A DRB establishment request message may comprise a DRB identity drb-Identity. Specifically, drb-Identity may be included in a cell ToAddModList. The DRB identity is used to uniquely identify the DRB (e.g., uniquely identify a DRB in UE). The DRB establishment request message may comprise a bearer type indication cell drb-TypeLNA used to indicate a type of a to-be-established bearer. For example, when an LTE is a master base station and an NR is a secondary base station, DRB types that can be indicated by the bearer type indication cell are: LTE-NR MCG bearers, LTE-NR SCG bearers, LTE-NR MCG split bearers, and LTE-NR SCG split bearers. Likewise, the process described above can be applied to other dual connectivity combining scenarios.

At step S630, a corresponding DRB is established according to the DRB establishment request message.

Specifically, for the situation where the DRB establishment request message comprises the bearer identity drb-Identity and a bearer corresponding to the bearer identity is not a bearer that has been configured by UE, the following steps can be performed:

If the bearer type indication cell drb-TypeLNA indicates that the corresponding DRB is an MCG bearer, then an MCG bearer establishment process is executed.

If the bearer type indication cell drb-TypeLNA indicates that the corresponding DRB is an SCG bearer, then an SCG bearer establishment process is executed.

If the bearer type indication cell drb-TypeLNA indicates that the corresponding DRB is an MCG split bearer, then an MCG split bearer establishment process is executed.

If the bearer type indication cell drb-TypeLNA indicates that the corresponding DRB is an SCG split bearer, then an SCG split bearer establishment process is executed.

Optionally, prior to performing the above steps, the UE can also determine an SeNB type following the method of differentiating dual connectivity types according to the cell carried in a DRB establishment/reconfiguration request message.

Optionally, after the DRB is established, the establishment and the identity of the DRB are indicated and reported to the upper layer.

It should be noted that the steps described above can be performed in any sequence, and are all optionally performed (a corresponding step can be performed only when a corresponding type of bearer is defined).

Reconfiguring A Data Bearer

Processes of reconfiguring a bearer in LTE, eLTE, and NR dual connectivity deployment scenarios are described below in a way similar to the way of describing a process of establishing an LWA bearer in LTE and WLAN aggregation (LWA).

At step S620, a bearer reconfiguration message is received. The bearer reconfiguration message can be used to modify/reconfigure a bearer that has been configured in UE. The bearer reconfiguration message can be an LTE, eLTE, or NR Radio Resource Control (RRC) reconfiguration message. The bearer reconfiguration message may comprise a bearer reconfiguration indication cell drb-TypeChangeLNA that indicates a reconfigured hearer type.

In addition, the bearer reconfiguration may comprise: reconfiguring an MCG bearer as an SCG hearer, and/or reconfiguring an MCG bearer as an MCG split bearer, and/or reconfiguring an MCG bearer as an SCG split bearer, and/or reconfiguring an SCG bearer as an MCG bearer, and/or reconfiguring an SCG bearer as an SCG split bearer, and/or reconfiguring an SCG bearer as an MCG split bearer, and/or reconfiguring an SCG split bearer as an MCG bearer, and/or reconfiguring an SCG split bearer as an SCG bearer, and/or reconfiguring an SCG split bearer as an MCG split bearer, and/or reconfiguring an MCG split bearer as an MCG bearer, and/or reconfiguring an MCG split bearer as an SCG bearer, and/or reconfiguring an MCG split bearer as an SCG split bearer, and/or reconfiguring an MCG bearer, and/or reconfiguring an SCG bearer, and/or reconfiguring an MCG split bearer, and/or reconfiguring an SCG split bearer.

At step S630, a bearer is reconfigured according to the hearer reconfiguration message. Specifically, for the situation where the bearer reconfiguration message comprises the hearer identity drb-Identity and a bearer corresponding to the bearer identity is a bearer that has been configured by UE, the following steps are performed:

If the bearer corresponding to the bearer identity drb-Identity and configured in the UE is an MCG bearer and the reconfigured bearer type indicated by the bearer reconfiguration indication cell drb-TypeChangeLNA is an MCG split bearer, then a process of reconfiguring an MCG bearer as an MCG split bearer is executed.

If the bearer corresponding to the bearer identity drb-Identity and configured in the UE is an MCG hearer and the reconfigured bearer type indicated by the bearer reconfiguration indication cell drb-TypeChangeLNA is an SCG bearer, then a process of reconfiguring an MCG bearer as an SCG bearer is executed.

If the hearer corresponding to the bearer identity drb-Identity and configured in the UE is an MCG bearer and the reconfigured bearer type indicated by the bearer reconfiguration indication cell drb-TypeChangeLNA is an SCG split hearer, then a process of reconfiguring an MCG bearer as an SCG split bearer is executed.

If the bearer corresponding to the bearer identity drb-Identity and configured in the UE is an SCG bearer and the reconfigured bearer type indicated by the bearer reconfiguration indication cell drb-TypeChangeLNA is an MCG bearer, then a process of reconfiguring an MCG bearer as an SCG bearer is executed.

If the bearer corresponding to the bearer identity drb-Identity and configured in the UE is an SCG bearer and the reconfigured bearer type indicated by the bearer reconfiguration indication cell drb-TypeChangeLNA is an SCG split bearer, then a process of reconfiguring an SCG bearer as an SCG split bearer is executed.

If the bearer corresponding to the bearer identity drb-Identity and configured in the UE is an SCG bearer and the reconfigured bearer type indicated by the bearer reconfiguration indication cell drb-TypeChangeLNA is an MCG split bearer, then a process of reconfiguring an SCG bearer as an MCG split bearer is executed.

If the bearer corresponding to the bearer identity drb-Identity and configured in the UE is an SCG split bearer and the reconfigured hearer type indicated by the hearer reconfiguration indication cell drb-TypeChangeLNA is an SCG bearer, then a process of reconfiguring an SCG split bearer as an SCG bearer is executed.

If the bearer corresponding to the bearer identity drb-Identity and configured in the UE is an SCG split bearer and the reconfigured bearer type indicated by the bearer reconfiguration indication cell drb-TypeChangeLNA is an MCG bearer, then a process of reconfiguring an SCG split bearer as an MCG hearer is executed.

If the hearer corresponding to the bearer identity drb-Identity and configured in the UE is an SCG split bearer and the reconfigured bearer type indicated by the bearer reconfiguration indication cell drb-TypeChangeLNA is an MCG split bearer, then a process of reconfiguring an SCG split bearer as an MCG split bearer is executed.

If the bearer corresponding to the bearer identity drb-Identity and configured in the UE is an MCG split bearer and the reconfigured bearer type indicated by the bearer reconfiguration indication cell drb-TypeChangeLNA is an SCG bearer, then a process of reconfiguring an MCG split bearer as an SCG bearer is executed.

If the bearer corresponding to the bearer identity drb-Identity and configured in the UE is an MCG split bearer and the reconfigured bearer type indicated by the bearer reconfiguration indication cell drb-TypeChangeLNA is an MCG bearer, then a process of reconfiguring an MCG split bearer as an MCG bearer is executed.

If the bearer corresponding to the bearer identity drb-Identity and configured in the UE is an MCG split bearer and the reconfigured bearer type indicated by the bearer reconfiguration indication cell drb-TypeChangeLNA is an SCG split bearer, then a process of reconfiguring an MCG split bearer as an SCG split bearer is executed.

If the bearer corresponding to the bearer identity drb-Identity and configured in the UE is an MCG bearer and the reconfigured bearer type indicated by the bearer reconfiguration indication cell drb-TypeChangeLNA is an MCG bearer (or the bearer reconfiguration indication cell is not included), then an MCG bearer reconfiguration process is executed.

If the bearer corresponding to the bearer identity drb-Identity and configured in the UE is an SCG bearer and the reconfigured bearer type indicated by the bearer reconfiguration indication cell drb-TypeChangeLNA is an SCG bearer (or the bearer reconfiguration indication cell is not included), then an SCG bearer reconfiguration process is executed.

If the bearer corresponding to the bearer identity drb-Identity and configured in the UE is an MCG split bearer and the reconfigured bearer type indicated by the bearer reconfiguration indication cell drb-TypeChangeLNA is an MCG split bearer (or the bearer reconfiguration indication cell is not included), then an MCG split bearer reconfiguration process is executed.

If the bearer corresponding to the bearer identity drb-Identity and configured in the UE is an SCG split bearer and the reconfigured bearer type indicated by the bearer reconfiguration indication cell drb-TypeChangeLNA is an SCG split bearer (or the bearer reconfiguration indication cell is not included), then an SCG split bearer reconfiguration process is executed.

It should be noted that the steps described above can be performed in any sequence, and are all optionally performed (a corresponding step can be performed only when a corresponding type of bearer reconfiguration is defined).

Ways of Differentiating Dual Connectivity Types

Since dual connectivity is divided into X-X dual connectivity (the master base station and the secondary base station are base stations of the same type) and X-Y dual connectivity (the master base station and the secondary base station are base stations of different types, also referred to as hybrid dual connectivity), X and Y can be eLTE eNBs or LIE eNBs or gNBs. The type of the secondary base station (or SCG or RAT) can be specified in the DRB establishment request message and/or DRB reconfiguration message; and the DRB establishment request message and/or DRB reconfiguration message can be an RRC reconfiguration message.

Specifically, in one embodiment, the DRB establishment request message and/or DRB reconfiguration message may comprise a bearer type indication cell (denoted as drb-TypeSCG) used to indicate the type of the to-be-established or to-be-reconfigured secondary base station (or SCG or RAT or DRB). In one embodiment, the value of the bearer type indication cell drb-TypeSCG can be taken from a set {LTE eNB, eLTE eNB, gNB}, {LTE SCG, eLTE SCG, NR SCG}, or {LTE, eLTE, NR}, or represented by two bits. In another embodiment, in a situation where the UE has determined the type of the master base station, the type of the hybrid dual connectivity secondary base station can be only one of the other two base stations types. If the type of the hybrid dual connectivity secondary base station is specified for a certain type of master base station, when the value of the bearer type indication cell is set to "True," "Setup," or "1," the secondary base station is hybrid dual connectivity of the base station of the corresponding type; and when the value of the bearer type indication cell is set to "False," "Release," or "0," or the indication does not occur, the secondary base station and the master base station are of the same type. Vice versa.

The UE can determine the type of the secondary base station (or SCG or RAT) according to the value of drb-TypeSCG; and the UE can determine the type of the master base station (or MCG or RAT) according to the type of the base station that executes initial random access.

In another embodiment, different types of SCGs (or SCells) are included in different types of cells; and the UE determines the type of the corresponding SCG or SCell or SeNB according to the received cell. For example, in hybrid dual connectivity, the secondary base station is a cell of an NR type and included in a cell sCellToAddModListNR (used to indicate an added/modified SCG SCell list) and/or sCellToAddModNR (used to indicate information regarding added/modified SCG SCells, such as cell identities); and if the bearer establishment or reconfiguration message received by the UE comprises sCellToAddModListNR and/or sCellToAddModNR, then the UE determines that the SCG or SeNB or SCell is of the NR type.

In another embodiment, different SCGs correspond to different configuration cells. For example, when the SeNB is an NR SeNB, the corresponding SCG configuration cell is denoted as scg-ConfigurationNR; when the SeNB is an LTE SeNB, the corresponding SCG configuration cell is denoted as scg-ConfigurationLTE; when the SeNB is an eLTE SeNB, the corresponding SCG configuration cell is denoted as scg-ConfigurationeLTE; the UE can determine the type of the secondary base station (SCG or RAT) according to the carried SCG configuration cell; and the UE can determine the type of the master base station (or MCG or RAT) according to the type of the base station that executes initial random access.

In the embodiments of the present application, different SCG configuration cells can be collectively denoted as scg-Configuration. For a specific dual connectivity deployment scenario, scg-Configuration can be replaced with a corresponding type of SCG configuration cell according to the type of the SeNB.

Processes of establishing and/or reconfiguring an MCG bearer, an SCG bearer, an MCG split bearer, and an SCG split bearer in eLTE, and NR dual connectivity deployment scenarios are described below in a way similar to the way of describing a process of establishing a data bearer in LTE dual connectivity.

First, an RB establishment/reconfiguration request message is received. The bearer establishment/reconfiguration request message is used to establish/modify/reconfigure the corresponding bearer. The bearer establishment/reconfiguration request message may be an LTE, eLTE, or NR Radio Resource Control (RRC) reconfiguration message. This depends on the dual connectivity deployment scenario: if the master base station is of an LTE type, then the bearer establishment/reconfiguration request message can be referred to as an LTE RRC reconfiguration message; if the master base station is of an eLTE type, then the hearer establishment/reconfiguration request message can be referred to as an eLTE RRC reconfiguration message; and if the master base station is of an NR type, then the bearer establishment/reconfiguration request message can be referred to as an NR RRC reconfiguration message. Preferably, an RRC reconfiguration message may comprise RRC reconfiguration messages from two or more Radio Access Technologies (RATs).

Next, the corresponding bearer is established/modified/reconfigured according to the DRB establishment/reconfiguration request message.

Specifically, in one embodiment, if scg-configuration is set to release, the UE has configured one or more MCG split DRBs or SCG DRBs or SCG split DRBs, and the received DRB establishment/reconfiguration request message comprises drb-ToAddModList, then a DRB establishment or modification or reconfiguration process described in the following steps 9001-9020 is executed.

If scg-configuration is set to release or the DRB establishment/reconfiguration request message comprises an indication for changing the SCG (denoted as mobilityControlInfoSCG) but does not comprise a handover indication (denoted as mobilityControlInfo), then the following operations are performed for each configured drb-identity in the UE:

If the corresponding DRB is an MCG split DRB, then PDCP data recovery is performed and an SCG RLC entity is reestablished;

If the corresponding DRB is an MCG DRB, drb-ToAddModListSCG is received and comprises drb-Identity, and the corresponding bearer reconfiguration indication identity (denoted as drb-TypeChangeLN) indicates an SCG DRB, then a PDCP entity and an MCG RLC entity are reestablished;

If the corresponding DRB is an MCG DRB, drb-ToAddModListSCG is received and comprises drb-Identity, and the corresponding bearer reconfiguration indication identity (denoted as drb-TypeChangeLN) indicates an SCG split DRB, then a PDCP entity is reestablished (or PDCP data recovery is performed) and/or an MCG RLC entity is reestablished; and If the corresponding DRB is an SCG DRB, then a PDCP entity and an SCG RLC entity are reestablished; and if the corresponding DRB is an SCG split DRB, then a PDCP entity is reestablished (or PDCP data recovery is performed) and an SCG RLC entity is reestablished.

The PDCP entity reestablishment and/or PDCP data recovery process described in the embodiment of the present application comprises at least one of the following operations (and may further include other operations):

If the upper layer sends a PDCP status report for the corresponding DRB configuration, then the PDCP status report is generated and sent to the lower layer as a first PDCP PDU for transmission; and A PDCP PDU retransmission operation is performed, wherein the lower layer has not confirmed that the PDCP PDU is successively transmitted.

In one embodiment, if the received DRB establishment/reconfiguration request message is not used to release an SCG (e.g., scg-Configuration is not set to release) and does not comprise a cell that indicates a change of an SCG (denoted as mobilityControlInfoSCG), and further, if the DRB establishment/reconfiguration request message comprises drb-ToAddModListSCG, then the DRB establishment or modification or reconfiguration process described in the following steps 9001-9020 is executed for each drb-Identity included in drb-ToAddModListSCG:

Step 9001: if drb-Identity is not configured in the UE, step 9002 is performed; otherwise, step 9005 is performed.

Step 9002: if the received DRB establishment/reconfiguration request message comprises drb-ToAddModList and the drb-Identity is included in drb-ToAddModList. Further, in one embodiment, if the RRC reconfiguration message comprises a split bearer type indication identity (denoted as drb-TypeSplit, each DRB corresponding to one drb-TypeSplit) and the indication identity indicates an establishment of an MCG split bearer, then an MCG split DRB is established; otherwise, step 9003*a* is performed; and in another embodiment, the type of the split bearer is determined according to whether PDCP-config is included in drb-ToAddModList or drb-ToAddModListSCG. Specifically, if PDCP-config is included in drb-ToAddModList, then an MCG split DRB is established; otherwise, step 9003*b* is performed.

Step 9003*a*: if the received DRB establishment/reconfiguration request message comprises drb-ToAddModList and the drb-Identity is included in drb-ToAddModList. Further, if the RRC reconfiguration message comprises a split bearer type indication identity (denoted as drb-TypeSplit) and the indication identity indicates an establishment of an SCG split bearer, then an SCG split DRB is established; otherwise, step 9004 is performed.

Step 9003*b*: if the received DRB establishment/reconfiguration request message comprises drb-ToAddModList and the drb-Identity is included in drb-ToAddModList. Further, the type of the split bearer is determined according to whether PDCP-config is included in drb-ToAddModList or drb-ToAddModListSCG. Specifically, if PDCP-config is included in drb-ToAddModListSCG, then an SCG split DRB is established; otherwise, step 9004 is performed.

Step 9004: an SCG bearer is established. Specifically, in one embodiment, if the UE determines that the received DRB establishment/reconfiguration request message does not comprise drb-ToAddModList, or even though the received DRB establishment/reconfiguration request message comprises drb-ToAddModList, the drb-Identity is not included in drb-ToAddModList, or the RRC reconfiguration message comprises a split bearer type indication identity (denoted as drb-TypeSplit) and the indication identity indicates an establishment of an SCG bearer, then an SCG bearer is established. Step 9005: if drb-ToAddModList and/or drb-ToAddModListSCG is received, then step 9006 is performed.

Step 9006: if a DRB indicated by drb-Identity is an MCG split DRB, then step 9007 is performed; otherwise, step 9010 is performed.

Step 9007: if drb-ToAddModList is received and comprises drb-Identity and a corresponding bearer reconfiguration indication identity (denoted as drb-TypeLN), if the bearer reconfiguration indication identity indicates an MCG DRB, then a process of reconfiguring an MCG split DRB as an MCG DRB is executed; otherwise, step 9008 is performed.

Step 9008: if drb-ToAddModList and drb-ToAddModListSCG are received and both comprise drb-Identity and a corresponding bearer reconfiguration indication identity (denoted as drb-TypeLN and/or drb-TypeChangeLN, both of which can be denoted using the same cell; drb-TypeLN is included in drb-ToAddModList; drb-TypeChangeLN is included in drb-ToAddModListSCG; a DRB establishment/reconfiguration request message can comprise one or both of drb-ToAddModList and drb-ToAddModListSCG, and in the latter situation, drb-ToAddModList and drb-ToAddModListSCG indicate the same type of DRBs; similarly hereinafter); if the bearer reconfiguration indication identity indicates an SCG split DRB, then a process of reconfiguring an MCG split RB as an SCG split DRB is executed; otherwise, step 9009 is performed.

Step 9009: if drb-ToAddModListSCG is received and comprises drb-Identity and a corresponding bearer reconfiguration indication identity (denoted as drb-TypeChangeLN); if the bearer reconfiguration indication identity indicates an SCG DRB, then a process of reconfiguring an MCG split DRB as an SCG DRB is executed; otherwise, step 9010 is performed.

Step 9010: a process of reconfiguring an MCG split DRB is executed.

Step 9011: if a DRB indicated by deb-Identity is an SCG split then step 9012 is performed; otherwise, step 9016 is performed.

Step 9012: if drb-ToAddModListSCG is received and comprises drb-Identity and a corresponding bearer reconfiguration indication identity (denoted as drb-TypeChangeLN), if the bearer reconfiguration indication identity indicates an SCG DRB, then a process of reconfiguring an SCG split DRB as an SCG DRB is executed; otherwise, step 9013 is performed.

Step 9013: if drb-ToAddModList is received and comprises drb-Identity and a corresponding bearer reconfiguration indication identity (denoted as drb-TypeLN); if the bearer reconfiguration indication identity indicates an MCG DRB, then a process of reconfiguring an SCG split DRB as an MCG DRB is executed; otherwise, step 9014 is performed.

Step 9014: if drb-ToAddModList and drb-ToAddModListSCG are received and both comprise drb-Identity and a corresponding bearer reconfiguration indication identity (denoted as drb-TypeLN and/or drb-TypeChangeLN), if the bearer reconfiguration indication identity indicates an MCG split DRB, then a process of reconfiguring an SCG split DRB as an MCG split DRB is executed; otherwise, step 9015 is performed.

Step 9015: a process of reconfiguring an SCG split DRB is executed.

Step 9016: if a DRB indicated by drb-Identity is an SCG DRB, then step 9017 is performed.

Step 9017: if drb-ToAddModList and drb-ToAddModListSCG are received and both comprise drb-Identity and a corresponding bearer reconfiguration indication identity (denoted as drb-TypeLN and/or drb-TypeChangeLN), if the bearer reconfiguration indication identity indicates an SCG split DRB, then a process of reconfiguring an SCG DRB as an SCG split DRB is executed; otherwise, step 9018 is performed.

Step 9018: if drb-ToAddModList is received and comprises drb-Identity and a corresponding bearer reconfiguration indication identity (denoted as drb-TypeLN), if the bearer reconfiguration indication identity indicates an MCG DRB, then a process of reconfiguring an SCG DRB as an MCG DRB is executed; otherwise, step 9019 is performed.

Step 9019: if drb-ToAddModList and drb-ToAddModListSCG are received and both comprise drb-Identity and a corresponding bearer reconfiguration indication identity (denoted as drb-TypeLN and/or drb-TypeChangeLN), if the bearer reconfiguration indication identity indicates an MCG split DRB, then a process of reconfiguring an SCG DRB as an MCG split DRB is executed; otherwise, step 9020 is performed, Step 9020: a process of reconfiguring an SCG DRB is executed.

Optionally, the DRB established in step 9002 or 9003 or 9004 and its identity are indicated to the upper layer.

Optionally, prior to performing the above steps, the UE also needs to determine an SeNB type in a way of distinguishing between dual connectivity types according to the cell carried in the DRB establishment/reconfiguration request message.

Steps 9002-9004 describe a bearer establishment process. Steps 9005-9020 describe a bearer modification/reconfiguration process.

In steps 9007-9009 and/or 9012-9014 and/or 9017-9019, it is also possible that the DRB type is not determined based on the bearer reconfiguration indication identity, but determined based on whether the PDCP configuration cell pdcp-Config is located in drb-ToAddModList or drb-ToAddModListSCG. If pdcp-Config is located in drb-ToAddModList, then the DRB type is an MCG split DRB; and if pdcp-Config is located in drb-ToAddModListSCG, then the DRB type is an SCG split DRB.

It should be noted that steps 9001-9020 described above can be performed only when the corresponding dual connectivity deployment scenario supports the corresponding bearer type and bearer reconfiguration type. For example, if a certain dual connectivity deployment does not support reconfiguring an MCG split DRB as an SCG DRB, then step 9009 is not performed. Regarding the value of the split bearer type indication identity drb-TypeSplit in steps 9002 and 9004: in one embodiment, when the value of the indication identity is set to "True" or "Setup" or "1" or "MCGSplit", it corresponds to an MCG split bearer; and when the value of the indication is set to "False" or "Release" or "0" or "SCGSplit" or the indication does not occur, it corresponds to an SCG split bearer. Vice versa. Furthermore, steps 9001-9020 are only an example showing execution sequence. Executing steps 9001-9020 in other order also falls within the scope of the present application.

It should be noted that according the specific SCG or SeNB types in the dual connectivity scenario, scg-Configuration involved in the embodiments of the present application can be denoted as scg-ConfigurationNR, scg-ConfigurationLTE, or scg-ConfigurationeLTE (the specific type depends on the SeNB type).

FIG. 7 illustrates a flowchart of a method for establishing/reconfiguring a data bearer according to another embodiment of the present application. As shown in FIG. 7, a method 700 starts at step S710. At step S720, a data bearer establishment/reconfiguration request message is sent. The request message may comprise a data bearer identity and a bearer type indication cell. The data bearer identity is used to identify a data bearer; and the bearer type indication cell is used to indicate a type of the to-be-established/reconfigured data bearer. At step S730, communication is performed by using an established/reconfigured corresponding data bearer. Finally, the method 700 ends at step S740.

Various specific exemplary processes of establishing/reconfiguring a data bearer involved in the present application are described below.

MCG Bearer Establishment Process:

Establishing an MCG DRB involves the following operations:

establishing a PDCP entity, and configuring the PDCP entity according to an MCG security configuration and a cell pdcp-Config included in drb-ToAddModList; and establishing an MCG RLC entity and an MCG DTCH logical channel according to rlc-Config, a logical channel identity logicalChannelIdentity, and a logicalChannelConfig cell included in drb-ToAddModList.

SCG Bearer Establishment Process:

Establishing an SCG DRB involves the following operations:

establishing a PDCP entity, and configuring the PDCP entity according to an SCG security configuration and a cell pdcp-Config included in drb-ToAddModListSCG; and establishing an SCG RLC entity and an SCG DTCH logical channel according to rlc-ConfigSCG, a logical channel identity logicalChannelIdentitySCG, and a logicalChannelConfigSCG cell included in drb-ToAddModListSCG.

MCG Split Bearer Establishment Process:

Establishing an MCG split DRB involves the following operations:

establishing a PDCP entity, and configuring the PDCP entity according to an MCG security configuration and a cell pdcp-Config included in drb-ToAddModList;

establishing an MCG RLC entity and an MCG DTCH logical channel according to rlc-Config, a logical channel identity logicalChannelIdentity, and a logicalChannelConfig cell included in drb-ToAddModList; and establishing an SCG RLC entity and an SCG DTCH logical channel according to rlc-ConfigSCG, a logical channel identity logicalChannelIdentitySCG, and a logicalChannelConfigSCG cell included in drb-ToAddModListSCG.

SCG Split Bearer Establishment Process:

Establishing an SCG split DRB involves the following operations:

establishing a PDCP entity, and configuring the PDCP entity according to an SCG security configuration and a cell pdcp-Config included in drb-ToAddModListSCG;

establishing an MCG RLC entity and an MCG DTCH logical channel according to rlc-Config, a logical channel identity logicalChannelIdentity, and a logicalChannelConfig cell included in drb-ToAddModList; and establishing an SCG RLC entity and an SCG DTCH logical channel according to rlc-ConfigSCG, a logical channel identity logicalChannelIdentitySCG, and a logicalChannelConfigSCG cell included in drb-ToAddModListSCG.

Process of Reconfiguring an MCG Bearer as an SCG Bearer

Reconfiguring an MCG bearer as an SCG bearer comprises the following operations:

reconfiguring a PDCP entity according to SCG security configuration information, and if drb-ToAddModListSCG comprises a cell pdcp-Config, reconfiguring the PDCP entity according to the pdcp-Config;

if drb-ToAddModListSCG comprises an rlc-ConfigSCG and/or logicalChannelConfigSCG cell, reconfiguring an SCG RLC entity and/or SCG DTCH logical channel according to the cell; and releasing an MCG RLC and an MCG DTCH logical channel.

Process of Reconfiguring an MCG Bearer as an MCG Split Bearer

Reconfiguring an MCG bearer as an MCG split bearer comprises the following operations:

if drb-ToAddModList comprises a cell pdcp-Config, reconfiguring a PDCP entity according to the pdcp-Config;

establishing an SCG RLC entity and an SCG DTCH logical channel according to rlc-ConfigSCG, a logical channel identity logicalChannelIdentitySCG, and a logicalChannelConfigSCG cell included in drb-ToAddModListSCG; and if drb-ToAddModList comprises an rlc-Config and/or logicalChannelConfig cell, reconfiguring an MCG RLC entity and/or MCG DTCH logical channel according to the cell.

Process of Reconfiguring an MCG Bearer as an SCG Split Bearer

Reconfiguring an MCG bearer as an SCG split bearer comprises the following operations:

reconfiguring a PDCP entity according to SCG security configuration information, and if drb-ToAddModListSCG comprises a cell pdcp-Config, reconfiguring the PDCP entity according to the pdcp-Config;

if drb-ToAddModList comprises an rlc-Config and/or logicalChannelConfig cell, reconfiguring an MCG RLC entity and/or MCG DTCH logical channel according to the cell; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an MCG Split Bearer as an MCG Bearer

Reconfiguring an MCG split bearer as an MCG bearer comprises the following operations:

releasing an SCG RLC and an SCG DTCH logical channel; and if drb-ToAddModList comprises an rlc-Config and/or logicalChannelConfig reconfiguring an MCG RLC entity and/or MCG DTCH logical channel according to the cell; and Process of Reconfiguring an MCG Split Bearer as an SCC Bearer Reconfiguring an MCG split bearer as an SCG bearer comprises the following operations:

reconfiguring a PDCP entity according to SCG security configuration information, and if drb-ToAddModListSCG comprises a cell pdcp-Config, reconfiguring the PDCP entity according to the pdcp-Config;

if drb-ToAddModListSCG comprises an rlc-ConfigSCG and/or logicalChannelConfigSCG cell, reconfiguring an SCG RLC entity and/or SCG DTCH logical channel according to the cell; and releasing an MCG RLC and an MCG DTCH logical channel.

Process of Reconfiguring an MCG Split Bearer as an SCG Split Bearer

Reconfiguring an MCG split bearer as an SCG split bearer comprises the following operations:

reconfiguring a PDCP entity according to SCG security configuration information, and if drb-ToAddModListSCG comprises a cell pdcp-Config, reconfiguring the PDCP entity according to the pdcp-Config;

if drb-ToAddModList comprises an rlc-Config and/or logicalChannelConfig cell, reconfiguring an MCG RLC entity and/or MCG DTCH logical channel according to the cell; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an SCG Bearer as an MCC Bearer

Reconfiguring an SCG bearer as an MCG bearer comprises the following operations:

reconfiguring a PDCP entity according to MCG security configuration information, and if drb-ToAddModList comprises a cell pdcp-Config, reconfiguring the PDCP entity according to the pdcp-Config;

if drb-ToAddModList comprises an rlc-Config and/or logicalChannelConfig reconfiguring an MCG RLC entity and/or MCG DTCH logical channel according to the cell; and releasing an SCG RLC and an SCG DTCH logical channel.

Process of Reconfiguring an SCG Bearer as an SCG Split Bearer

Reconfiguring an SCG hearer as an SCG split bearer comprises the following operations:

if drb-ToAddModListSCG comprises a cell pdcp-Config, reconfiguring a PDCP entity according to the pdcp-Config;

establishing an MCG RLC entity and an MCG DTCH logical channel according to rlc-Config, a logical channel identity logicalChannelIdentity, and a logicalChannelConfig cell included in drb-ToAddModList; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an SCG Bearer as an MCG Split Bearer

Reconfiguring an SCG bearer as an MCG split bearer comprises the following operations:

reconfiguring a PDCP entity according to MCG security configuration information, and if drb-ToAddModList comprises a cell pdcp-Config, reconfiguring the PDCP entity according to the pdcp-Config;

establishing an MCG RLC entity and an MCG DTCH logical channel according to rlc-Config, a logical channel identity logicalChannelIdentity, and a logicalChannelConfig cell included in drb-ToAddModList; and if drb-ToAddModListSCG comprises an rlc-ConfiSCGg and/or logicalChannelConfigSCG cell, reconfiguring an SCG RLC entity and/or SCG DTCH logical channel according to the cell.

Process of Reconfiguring an SCC Split Bearer as an MCG Bearer

Reconfiguring an SCG split bearer as an MCG bearer comprises the following operations:

reconfiguring a PDCP entity according to MCG security configuration information, and if drb-ToAddModList comprises a cell pdcp-Config, reconfiguring the PDCP entity according to the pdcp-Config;

if drb-ToAddModList comprises an rlc-Config and/or logicalChannelConfig reconfiguring an MCG RLC entity and/or MCG DTCH logical channel according to the cell; and releasing an SCG RLC and an SCG DTCH logical channel.

Process of Reconfiguring an SCG Split Bearer as an SCG Bearer

Reconfiguring an SCG split bearer as an SCG bearer comprises the following operations:

if drb-ToAddModListSCG comprises a cell pdcp-Config, reconfiguring a PDCP entity according to the pdcp-Config;

if drb-ToAddModListSCG comprises an rlc-Config and/or logicalChannelConfig cell, reconfiguring an SCG RLC entity and/or SCG DTCH logical channel according to the cell; and releasing an MCG RLC and an MCG DTCH logical channel.

Process of Reconfiguring an SCG Split Bearer as an MCG Split Bearer

Reconfiguring an SCG split bearer as an MCG split bearer comprises the following operations:

reconfiguring a PDCP entity according to MCG security configuration information, and if drb-ToAddModList comprises a cell pdcp-Config, reconfiguring the PDCP entity according to the pdcp-Config;

if drb-ToAddModList comprises an rlc-Config and/or logicalChannelConfig reconfiguring an MCG RLC entity and/or MCG DTCH logical channel according to the cell; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an MCG Bearer

Reconfiguring an MCG bearer comprises the following operations:

if drb-ToAddModList comprises a cell pdcp-Config, reconfiguring a PDCP entity according to the pdcp-Config; and if drb-ToAddModList comprises an rlc-Config and/or logicalChannelConfig reconfiguring an MCG RLC entity and/or MCG DTCH logical channel according to the cell.

Process of Reconfiguring an SCG Bearer

Reconfiguring an SCG bearer comprises the following operations:

if drb-ToAddModListSCG comprises a cell pdcp-Config, reconfiguring a PDCP entity according to the pdcp-Config; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an MCG Split Bearer

Reconfiguring an MCG split bearer comprises the following operations:

if drb-ToAddModList comprises a cell pdcp-Config, reconfiguring a PDCP entity according to the pdcp-Config;

if drb-ToAddModList comprises an rlc-Config and/or logicalChannelConfig reconfiguring an MCG RLC entity and/or MCG DTCH logical channel according to the cell; and if drb-ToAddModListSCG comprises an rlc-ConfigSCG and/or logicalChannelConfigSCG cell, reconfiguring an SCG RLC entity and/or SCG DTCH logical channel according to the cell.

Process of Reconfiguring an SCG Split Bearer

Reconfiguring an SCG split bearer comprises the following operations:

if drb-ToAddModListSCG comprises a cell pdcp-Config, reconfiguring a PDCP entity according to the pdcp-Config;

if drb-ToAddModList comprises an rlc-Config and/or logicalChannelConfig reconfiguring an MCG RLC entity and/or MCG DTCH logical channel according to the cell; and if drb-ToAddModListSCG comprises an rlc-ConfigSCG and/or logicalChannelConfigSCG cell, reconfiguring an SCG RLC entity and/or SCG DTCH logical channel according to the cell.

It should be noted that after the UE determines the SeNB type, the operations on the SCG related entities described in the embodiments of the present application (comprising establishing and/or modifying and/or reconfiguring and/or reestablishing PDCP entities and/or SCG RLC entities and/or SCG DTCH logical channels) can be accordingly described as follows: the UE instructs the NR or/eLTE or LIE related entities (e.g., an RRC entity, wherein the corresponding RRC entity type is determined according to the SeNB type) to establish and/or modify and/or reconfigure and/or reestablish and/or release PDCP entities and/or SCG RLC entities and/or SCG DTCH logical channels.

Accordingly, after the UE determines the MeNB type, the operations on the MCG related entities described in the embodiments of the present application (comprising establishing and/or modifying and/or reconfiguring and/or reestablishing PDCP entities and/or MCG RLC entities and/or MCG DTCH logical channels) can be accordingly described as follows: the UE instructs the NR or/eLTE or LTE related entities (e.g., an RRC entity, wherein the corresponding RRC entity type is determined according to the MeNB type) to establish and/or modify and/or reconfigure and/or reestablish and/or release PDCP entities and/or MCG RLC entities and/or MCG DTCH logical channels.

If LNAAP entities are included in LTE or eLTE and NR dual connectivity deployments, then the DRB establishment or releasing or modification or reconfiguration process in the embodiments of the present application further involves the following: the UE enables (establishes) or disables (deletes) or configures or reconfigures the LNAAP entities for the DRB.

FIG. 8 illustrates a block diagram of a user equipment according to an embodiment of the present application. As shown in the figure, a user equipment UE 800 comprises a receiving unit 810 and a processing unit 820.

The receiving unit 81 is configured to receive a data bearer establishment/reconfiguration request message. The request message comprises a data bearer identity and a bearer type indication cell. The data bearer identity is used to identify a data bearer; and the bearer type indication cell is used to indicate a type of the to-be-established/reconfigured data bearer.

The processing unit 820 is configured to establish/reconfigure a corresponding data bearer according to the request message. The specific process has been described in detail above with reference to FIG. 6, and is not repeated herein, FIG. 9 illustrates a block diagram of a base station according to an embodiment of the present application. As shown in the figure, a base station BS 900 comprises a sending unit 910 and a communication unit 920.

The sending unit 910 is configured to send a data bearer establishment/reconfiguration request message. The request message comprises a data bearer identity and a bearer type indication cell. The data bearer identity is used to identify a data bearer; and the bearer type indication cell is used to indicate a type of the to-be-established/reconfigured data bearer.

The communication unit 920 is configured to perform communication by using an established/reconfigured corresponding data bearer. The specific process has been described in detail above with reference to FIG. 7, and is not repeated herein.

It should be noted that although the types of the master and secondary base stations are not clearly specified in the embodiments of the present application, they are applicable to dual connectivity deployment manners of any combinations of LTE eNBs, eLTE eNBs, and gNBs. The UE determines the type of the master base station by using the RAT technology used in its initial access. For example, if the UE executes initial random access on an LTE eNB, then the corresponding MeNB is the UTE eNB; if the UE executes initial random access on an eLTE eNB, then the corresponding MeNB is the eLTE eNB; and if the UE executes initial random access on a gNB, then the corresponding MeNB is the gNB.

It should be noted that when describing the above-mentioned embodiments, the present application does not clearly specify the types of the master and secondary base stations. The present application is applicable to deployment scenarios of any combinations of the following master base station and secondary base station: the master base station can be an LIE eNB and/or eLTE eNB and/or gNB; and the secondary base station can be an LTE eNB and/or eLTE eNB and/or gNB. The present application is also applicable to other dual connectivity deployment scenarios, e.g., 6G. The terms used may vary in different communication systems; but the above-described procedures are still applicable.

The program running on the device according to the present application may be a program that enables the computer to implement the functions of the embodiments of the present application by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present application may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present application may also be implemented using these new integrated circuit technologies.

Furthermore, the present application is not limited to the embodiments described above. Although various examples of the described embodiments have been described, the present application is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present application have been described in detail above with reference to the accompanying drawings. However, the specific structures are not limited to the above embodiments, and the present application also includes any design modifications that do not depart from the main idea of the present application. In addition, various modifications can be made to the present application within the scope of the claims, and embodiments resulting from the appropriate combination of the technical means disclosed in different embodiments are also included within the technical scope of the present application. In addition, components with the same effect described in the above embodiments may be replaced with one another.

The invention claimed is:

1. A method performed by a User Equipment (UE), the method comprising:
   receiving a Radio Resource Control (RRC) reconfiguration message;
   performing, by a Long-Term Evolution (LTE) RRC entity, a secondary cell group (SCG) reconfiguration after determining that a first information element is included in the RRC reconfiguration message to indicate an LTE base station (BS) as a secondary BS; and
   performing, by a New Radio (NR) RRC entity, an SCG reconfiguration after determining that a second information element is included in the RRC reconfiguration message to indicate an NR BS as a secondary BS.

2. The method of claim 1, wherein the first information element is denoted as scg-ConfigurationLTE.

3. The method of claim 1, wherein the second information element is denoted as scg-ConfigurationNR.

4. The method of claim 1, further comprising:
   performing, by the NR RRC entity, the SCG reconfiguration to re-establish a Radio Link Control (RLC) entity.

5. The method of claim 1, further comprising:
   performing, by the NR RRC entity, the SCG reconfiguration to release a Radio Link Control (RLC) entity and release an associated logical channel.

6. The method of claim 1, further comprising:
   performing, by the NR RRC entity, the SCG reconfiguration to establish a Radio Link Control (RLC) entity and configure an associated channel.

7. The method of claim 1, further comprising:
   after determining that the secondary BS is the LTE BS and the first information element in the RRC reconfiguration message is set to release, and
   after determining that a handover indication is not included in the RRC reconfiguration message,
   re-establishing, by the LTE RRC entity, a Packet Data Convergence Protocol (PDCP) entity and an SCG Radio Link Control (RLC) entity for each data radio bearer (DRB) identity, the DRB identity is part of current UE configuration when a DRB indicated by the DRB identity is an SCG DRB;
   wherein the DRB identity is denoted as drb-Identity,
   wherein the handover indication is denoted as mobilityControlInfo.

8. The method of claim 1, further comprising:
   after determining that the secondary BS is the LTE base station and an SCG change indication is included in the RRC reconfiguration message, and
   after determining that a handover indication is not included in the RRC reconfiguration message,
   re-establishing, by the LTE RRC entity, a Packet Data Convergence Protocol (PDCP) entity and an SCG Radio Link Control (RLC) entity for each data radio bearer (DRB) identity, the DRB identity is a part of current UE configuration when a DRB indicated by the DRB identity is an SCG DRB;
   wherein the DRB identity is denoted as drb-Identity,
   wherein the handover indication is denoted as mobilityControlInfo.

9. The method of claim 8, wherein the SCG change indication is denoted as mobilityControlInfoSCG.

10. The method of claim 1, further comprising:
    after determining that the secondary BS is the NR base station, and
    after determining that the received RRC reconfiguration message includes an SCG radio resource configuration and the SCG radio resource configuration includes an SCG modification list,
    reconfiguring, by the NR RRC entity, a Data Convergence Protocol (PDCP) entity in accordance with a PDCP configuration for each data radio bearer (DRB) identity included in the SCG modification list that is a part of current UE configuration, if the corresponding PDCP configuration is included in the SCG modification list,
    wherein, the SCG radio resource configuration is denoted as radioResourceConfigDedicatedSCG for configuring the radio resource of SCG, the SCG modification list is denoted as drb-ToAddModListSCG for indicating a list of DRBs to be added or modified, the DRB identity is denoted as drb-Identity for identifying a DRB and the PDCP configuration for each DRB identity is denoted as pdcp-Config for setting configurable PDCP parameters for the DRB.

11. A User Equipment (UE), comprising:
    one or more non-transitory computer-readable media having computer-executable instructions embodied thereon; and
    at least one processor coupled to the one or more non-transitory computer-readable media, and configured to execute the computer-executable instructions to:
    receive a Radio Resource Control (RRC) reconfiguration message;
    perform, by a Long-Term Evolution (LTE) RRC entity, a secondary cell group (SCG) reconfiguration after determining that a first information element is included in the RRC reconfiguration message to indicate an LTE base station (BS) as a secondary BS; and
    perform, by a New Radio (NR) RRC entity, an SCG reconfiguration after determining that a second information element is included in the RRC reconfiguration message to indicate an NR BS as a secondary BS.

12. The UE of claim 11, wherein the first information element is denoted as scg-ConfigurationLTE.

13. The UE of claim 11, wherein the second information element is denoted as scg-ConfigurationNR.

14. The UE of claim 11, the computer-executable instructions further instruct the processor to:
    perform, by the NR RRC entity, the SCG reconfiguration to re-establish a Radio Link Control (RLC) entity.

15. The UE of claim 11, the computer-executable instructions further instruct the processor to:
    perform, by the NR RRC entity, the SCG reconfiguration to release a Radio Link Control (RLC) and release an associated logical channel.

16. The UE of claim 11, the computer-executable instructions further instruct the processor to:
    perform, by the NR RRC entity, the SCG reconfiguration to establish a Radio Link Control (RLC) entity and configure an associated channel.

17. The UE of claim 11, the computer-executable instructions further instruct the processor to:

after determining that the secondary BS is the LTE BS and the first information element in the RRC reconfiguration message is set to release, and after determining that a handover indication is not included in the RRC reconfiguration message, re-establish, by the LTE RRC entity, a Packet Data Convergence Protocol (PDCP) entity and an SCG Radio Link Control (RLC) entity for each data radio bearer (DRB) identity, the DRB identity is part of current UE configuration when a DRB indicated by the DRB identity is an SCG DRB, wherein the DRB identity is denoted as drb-Identity;

wherein the handover indication is denoted as mobilityControlInfo.

18. The UE of claim 11, the computer-executable instructions further instruct the processor to:

after determining that the secondary BS is the LTE base station and an SCG change indication is included in the RRC reconfiguration message, and after determining that a handover indication is not included in the RRC reconfiguration message, re-establish, by the LTE RRC entity, a Packet Data Convergence Protocol (PDCP) entity and an SCG Radio Link Control (RLC) entity for each data radio bearer (DRB) identity, the DRB identity is a part of current UE configuration when a DRB indicated by the DRB identity is an SCG DRB, wherein the DRB identity is denoted as drb-Identity;

wherein the handover indication is denoted as mobilityControlInfo.

19. The UE of claim 18, wherein the SCG change indication is denoted as mobilityControlInfoSCG.

20. The UE of claim 11, the computer-executable instructions further instruct the processor to:

after determining that the secondary BS is the NR base station, and after determining that the received RRC reconfiguration message includes an SCG radio resource configuration and the SCG radio resource configuration includes an SCG modification list, reconfigure, by the NR RRC entity, a Packet Data Convergence Protocol (PDCP) entity in accordance with a PDCP configuration for each data radio bearer (DRB) identity included in the SCG modification list that is a part of current UE configuration, if the corresponding PDCP configuration is included in the SCG modification list, wherein, the SCG radio resource configuration is denoted as radioResourceConfigDedicatedSCG for configuring the radio resource of SCG, the SCG modification list is denoted as drb-ToAddModListSCG for indicating a list of DRBs to be added or modified, the DRB identity is denoted as drb-Identity for identifying a DRB and the PDCP configuration for each DRB identity is denoted as pdcp-Config for setting configurable PDCP parameters for the DRB.

* * * * *